(12) United States Patent
Cowger et al.

(10) Patent No.: US 8,347,818 B2
(45) Date of Patent: Jan. 8, 2013

(54) HUMMINGBIRD LIQUID FEEDER

(76) Inventors: Kimberly L. Cowger, Paonia, CO (US);
Patrick D. Cowger, Paonia, CO (US)

( * ) Notice: Subject to any disclaimer, the term of this patent is extended or adjusted under 35 U.S.C. 154(b) by 0 days.

(21) Appl. No.: 13/224,469

(22) Filed: Sep. 2, 2011

(65) Prior Publication Data
US 2012/0060762 A1    Mar. 15, 2012

Related U.S. Application Data

(60) Provisional application No. 61/381,125, filed on Sep. 9, 2010, provisional application No. 61/381,118, filed on Sep. 9, 2010, provisional application No. 61/381,096, filed on Sep. 9, 2010.

(51) Int. Cl.
*A01K 7/00*    (2006.01)
(52) U.S. Cl. ........................................... 119/74; 119/72
(58) Field of Classification Search ............... 119/74, 119/72, 75, 77, 52.2, 57.8, 57.9
See application file for complete search history.

(56) References Cited

U.S. PATENT DOCUMENTS

| | | | |
|---|---|---|---|
| 5,123,574 A | | 6/1992 | Poulos |
| 5,303,674 A | * | 4/1994 | Hyde, Jr. ........................ 119/77 |
| 5,493,999 A | * | 2/1996 | Schenck ........................ 119/72 |
| 7,000,566 B2 | | 2/2006 | Fort, II |
| 7,040,251 B2 | | 5/2006 | Fort, II |
| 7,234,418 B2 | | 6/2007 | Fort, II et al. |
| 7,600,487 B2 | | 10/2009 | Stone et al. |
| 7,861,671 B2 | * | 1/2011 | Carter et al. .................... 119/72 |
| 7,946,249 B2 | * | 5/2011 | Colvin et al. .................... 119/78 |
| 8,011,323 B2 | * | 9/2011 | Vaughn et al. .................. 119/72 |
| D656,690 S | * | 3/2012 | Tu .............................. D30/127 |
| 2001/0029899 A1 | * | 10/2001 | Arlitt ............................ 119/77 |
| 2006/0037546 A1 | * | 2/2006 | Jung et al. ....................... 119/72 |
| 2000/9032076 | | 12/2009 | Gauker et al. |

\* cited by examiner

*Primary Examiner* — Yvonne Abbott (57) ABSTRACT

The hummingbird liquid feeder includes a base, a liquid tray attached to the base, a flange that fits inside the liquid tray, and a liquid container that rotatingly engages the liquid tray in a fill mode to permit filling without removing or inverting the liquid container while preventing spillage and alternately in a feed mode to permit the flow of the nectar into a moat for access thereto through feeding ports in the base and featuring a vertically-oriented stabilization member centrally disposed on the liquid tray that receives a support post pole disposed on a plate to stabilize and support the device during windy and inclement weather conditions.

9 Claims, 7 Drawing Sheets

HUMMINGBIRD LIQUID FEEDER

CROSS-REFERENCE TO RELATED APPLICATIONS

U.S. Provisional Application No. 61/381,125 filed on Sep. 9, 2010;
U.S. Provisional Application No. 61/381,118 filed on Sep. 9, 2010; and
U.S. Provisional Application No. 61/381,096 filed on Sep. 9, 2010

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of bird feeder devices are known in the prior art. Past hummingbird liquid feeders must be filled by unhooking to feeder from the support, such as a tree or post, then turning the feeder upside down, and finally filling it from the bottom end. The process results in the spilling of nectar, thus causing a mess and unnecessarily wasting nectar. In addition, past hummingbird liquid feeders are hanged from the top of the feeder to a tree branch or pole resulting in an unstable feeder that swings about during windy conditions as well as in bad weather which, in turn, prevents birds from landing on and keeping their balance on the feeder while also spilling nectar. The instant hummingbird liquid feeder solves the feeder filling, nectar spillage, and feeder stability issues by allowing the refilling of the present feeder without having to remove and invert the feeder and thus reducing nectar spillage and by providing a solid stable structure to prevent the present feeder from swinging about during windy and inclement weather conditions further reducing nectar spillage while allowing birds to land on and keep their balance.

FIELD OF THE INVENTION

The present invention relates to bird feeders, and more particularly, to a hummingbird liquid feeder.

SUMMARY OF THE INVENTION

In order to fill traditional hummingbird feeders, individuals must unhook the feeder from the tree or post, turn the feeder upside down, and fill it from the bottom. As this happens, nectar may fall out of the openings and spill all over the ground, causing a mess and creating wasted nectar. Additionally, most hummingbird feeders are designed to hang from the top of the feeder from a tree branch or pole. This conventional design does not provide any stability for the feeder. When it's windy or breezy outside or during bad weather, the feeder can swing and blow around, preventing birds from landing or keeping their balance, as well as causing the nectar to fall to the ground. An effective solution is necessary. The present hummingbird feeder provides a solid feeding structure and a convenient method for refilling it by providing a top-fill hummingbird feeder designed to allow individuals to refill the feeder without having to turn it upside down, which can cause nectar loss. The supportive base provides a solid structure on which the feeder can rest, preventing it from swinging during windy days and inclement weather and eliminating the loss of nectar. The supportive base and the feeder are designed to work in tandem as an all-encompassing hummingbird feeder device. Bird enthusiast, nature appreciators, homeowners, and anyone that owns or would like to own a hummingbird feeder will appreciate the benefits that the present device affords. In addition, the present hummingbird feeder provides a series of decorative and functional embellishing attachment for a specially designed hummingbird feeder and mounting device. These attachments removably attach to a stabilization member disposed on a liquid tray of the feeder to allow hummingbird feeder owners to personalize their feeder with interchangeable designs, such as butterflies, flowers, and fairies, as well as colors. The different attachments can also be designed to coordinate with the different seasons and can be easily applied and removed, allowing birdfeeder owners to swap out the attachments as often as they wish. These owners will appreciate the individuality, as well as the interchangeability, that this device provides. The support post, keeps the present hummingbird feeder from swinging during windy days and inclement weather, which can reduce and eliminate nectar loss. Additionally, when large birds land on the feeder or if the feeder becomes unbalanced due to an uneven distribution of weight, the support post will prevent the feeder from leaning to one side. The support post includes a base and a post and is constructed from metal square rock, steel plating, and small metal round stock. Screws can be used to attach the base and post mounts, depending on the size of the feeder and how much support the feeder needs. The pole can have a pointed bottom to easily drive the pole into the ground. Portions of the pole can be slip-fitted together, allowing it to come apart for easy storage and transit. In addition, the pole can have one, two, four or more base-mounted arched arms which can be attached to the pole in different locations along the pole, creating a variety of looks. The bases can be provided in two different sizes, such as regular size providing an approximately 6-inch×6-inch steel plate welded to a 3-inch tall post and a large size with an approximately 8-inch×8-inch steel plate welded to a post having a height in a range of approximately 6-inches to 8-inches. The pole mount slips into the bottom of the pole and has four L-shaped stabilizer arms, each part of the arm measuring approximately 8 inches in length. The pole mount can be attached to the pole via screws. The support post can also be attached to a deck or to a wall.

The general purpose of the present hummingbird liquid feeder, described subsequently in greater detail, is to provide a hummingbird liquid feeder which has many novel features that result in a hummingbird liquid feeder which is not anticipated, rendered obvious, suggested, or even implied by prior art, either alone or in combination thereof.

To accomplish this, the present hummingbird liquid feeder includes a base, a liquid tray attached to the base, a flange that fits inside the liquid tray, and a liquid container. The base includes a centrally-disposed annular upper collar having an exterior side, an interior side, a top edge, and a bottom edge. The base also includes an annular receiver body having an outer wall. The receiver body includes a quoit-shaped top surface having a lower edge and an upper edge continuously attached to the bottom edge of the base.

A plurality of spaced apart feeding ports is disposed in the top surface in a position between the lower edge and the upper edge. A notch is disposed between the top surface bottom edge and the receiver body outer wall. An L-shaped protrusion is disposed within the receiver body outer wall on a lower end of each notch. An opening is disposed between a first side of each notch and the respective protrusion.

The base further includes an annular perch lip having a plurality of first extensions radially disposed therefrom. Each first extension is disposed between the perch lip and the receiver body outer wall in a central position between a pair of the notches. The perch lip and the upper collar are concentrically disposed. The perch lip is configured to be gripped by a hummingbird. In addition, the outer wall has a height greater than a height of the perch lip.

The liquid tray includes an annular central collar having a plurality of slots therein. An elongated vertically-oriented cylindrical stabilization member is centrally disposed within the central collar. A vertically-oriented first channel is continuously disposed within the stabilization member. A second channel is continuously disposed between the central collar and the stabilization member. A moat is concentrically disposed in relation to the central collar. A raised outer rim having a plurality of spaced-apart tabs extends from a perimeter of the moat. The outer rim and the moat are concentric.

A flange is disposed within the liquid tray second channel to prevent leakage. The flange includes a substantially annular body having an interior wall and an exterior wall with a plurality of spaced-apart protuberances vertically disposed on the exterior wall and a plurality of vertically disposed spaced-apart indentations within the central collar. An aperture is disposed within each of the protuberances. Each aperture aligns with a respective one of the indentations to permit flow from the liquid tray second channel through the indentations into the moat. A sealing member is disposed between each of the protuberances. Each of the liquid tray outer rim tabs lockingly engages and alternately disengages one of the respective base receiver body notches thus removably attaching the liquid tray to the base.

The liquid container is configured to contain a volume of liquid nectar. The liquid container includes a sealable top end. A lid is threadingly attached to the liquid container top end. An attachment member is centrally disposed on the lid to permit the device to be hanged therefrom. A bottom end of the liquid container has a plurality of spaced-apart holes therein and a locking protrusion horizontally disposed between each of the holes. Each locking protrusion lockingly engages and alternately disengages a respective one of the liquid tray slots. The liquid container top end has a diameter at least equal to a diameter of the bottom end to make the filling of the liquid container through the top end easier than if the diameter of the top end were small. A gasket is disposed between the top end and the lid to prevent seepage from the liquid container.

Upon the engagement of the locking protrusions and liquid tray slots, the liquid container and the liquid tray operationally engage each other in a feed mode. Upon the operational engagement of the liquid container and the liquid tray in the feed mode, the receiver body openings and the liquid container holes are disposed in an aligned open position whereby the liquid nectar flows from the liquid container, through the liquid tray second channel, through the apertures disposed in each of the flange protuberances, and into the moat. Upon the flow of liquid nectar into the moat, a hummingbird has access to the liquid nectar through the feeding ports.

Upon the engagement of the liquid container and the liquid tray in a clean mode, the base, the liquid tray and the liquid container are separable from each other to allow a user to clean the device. Upon the engagement of the liquid container and the liquid tray in a fill mode, the receiver body openings and the liquid container holes are disposed in an unaligned closed position, whereby the volume of liquid nectar is captured within the liquid container.

A mode indicator protuberance is vertically disposed on the upper collar of the base. A clean marker is disposed proximal to the liquid container bottom end. Upon the alignment of the mode indicator protuberance with the clean marker, the liquid tray, and the liquid container are engaged in the clean mode whereby the base, the liquid tray, and the liquid container are separable for cleaning.

A fill marker is disposed proximal to the liquid container bottom end proximal to the clean marker. Upon the alignment of the mode indicator protuberance with the fill marker, the base, the liquid tray, and the liquid container are engaged in the fill mode.

A feed marker is disposed proximal to the liquid container bottom end proximal to the fill marker. Upon the alignment of the mode indicator protuberance with the feed marker, the base, the liquid tray, and the liquid container are engaged in the feed mode.

The hummingbird liquid feeder further includes a support post. The support post includes a pole, at least one horizontally oriented arm attached to the pole, and a plate disposed on an outer end of the arm. A vertically oriented cylindrical dowel is centrally disposed atop the plate. The dowel has a diameter smaller than a diameter of the stabilization member. The dowel engages the stabilization member first channel to prevent the spillage of the liquid nectar from the device and to stabilize the device in windy conditions thereby allowing a hummingbird to perch on the perch lip. The pole can be cylindrical or parallelepiped.

The lid can be provided in the form of a wide-brimmed hat to shelter the device from rain to prevent overflow and wash out of the liquid nectar. Alternatively, an umbrella-shaped covering for sheltering the base from rainfall can be provided to prevent overflow and wash out of the liquid nectar. The covering can be provided as a snap-on feature and alternately as a screw-on feature.

Thus has been broadly outlined the more important features of the present hummingbird liquid feeder so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 7 thereof, example of the instant hummingbird liquid feeder employing the principles and concepts of the present hummingbird liquid feeder and generally designated by the reference number 10 will be described.

Referring to FIGS. 1 through 7 a preferred embodiment of the present hummingbird liquid feeder 10 is illustrated. The hummingbird liquid feeder 10 includes a base 20, a liquid tray 50 removably attached to the base 20, a flange 71 that fits inside the liquid tray 50, and a liquid container 84 removably attached to the liquid tray 50 through the flange 71. The base 20 includes a centrally-disposed annular upper collar 21 having an exterior side 23, an interior side 25, a top edge 27, and a bottom edge 28. The base 20 also includes an annular receiver body 29 having an outer wall 30. The receiver body 29 includes a quoit-shaped top surface 31 having a lower edge 32 and an upper edge 33 continuously attached to the bottom edge 28 of the base 20.

A plurality of spaced apart feeding ports 35 is disposed in the top surface 31 in a position between the lower edge 32 and the upper edge 33. A notch 39 is disposed between the top surface 31 bottom edge 28 and the receiver body 29 outer wall 30. An L-shaped protrusion 40 is disposed within the receiver body 29 outer wall 30 on a lower end 41 of each notch 39. An opening 43 is disposed between a first side 45 of each notch 39 and the respective protrusion 40.

The base 20 further includes an annular perch lip 47 having a plurality of first extensions 49 radially disposed therefrom. Each first extension 49 is disposed between the perch lip 47 and the receiver body 29 outer wall 30 in a central position between a pair of the notches 39. The perch lip 47 and the upper collar 21 are concentrically disposed. The perch lip 47 is configured to be gripped by a hummingbird 122. In addition, the outer wall 30 has a height greater than a height of the perch lip 47.

The liquid tray 50 includes an annular central collar 51 having a plurality of slots 53 therein. An elongated vertically-oriented cylindrical stabilization member 55 is centrally disposed within the central collar 51. A vertically-oriented first channel 57 is continuously disposed within the stabilization member 55. A second channel 58 is continuously disposed between the central collar 51 and the stabilization member 55. A moat 60 is concentrically disposed in relation to the central collar 51. A raised outer rim 62 having a plurality of spaced-apart tabs 64 extends from a perimeter 66 of the moat 60. The outer rim 62 and the moat 61 are concentric.

A flange 71 is disposed within the liquid tray 50 second channel 58 to prevent leakage. The flange 71 includes a substantially annular body 73 with a plurality of spaced-apart protuberances 77 vertically disposed on an exterior wall 75 of the body 73 and a plurality of vertically disposed spaced-apart indentations 54 within the central collar 51. An aperture 78 is disposed within each of the protuberances 77. Each aperture 78 aligns with a respective one of the indentations 54 to permit flow from the liquid tray 50 second channel 58 through the indentations 54 into the moat 60. A sealing member 81 is disposed between each of the protuberances 77. Each of the liquid tray 50 outer rim 62 tabs 64 lockingly engages and alternately disengages one of the respective base 20 receiver body 29 notches 39 thus removably attaching the liquid tray 50 to the base 20.

The liquid container 84 is configured to contain a volume of liquid nectar 120. The liquid container 84 includes a sealable top end 86. A lid 87 is threadingly attached to the liquid container 84 top end 86. An attachment member 88 is centrally disposed on the lid 87 to permit the device 10 to be hanged therefrom. A bottom end 89 of the liquid container 84 has a plurality of spaced-apart holes 90 therein and a locking protrusion 91 horizontally disposed between each of the holes 90. Each locking protrusion 91 lockingly engages and alternately disengages a respective one of the liquid tray 50 slots 53. The liquid container 84 top end 86 has a diameter at least equal to a diameter of the bottom end 89 to make the filling of the liquid container 84 through the top end 86 easier than if the diameter of the top end 86 were small. A gasket 92 is disposed between the top end 86 and the lid 87 to prevent seepage from the liquid container 84.

Upon the engagement of the locking protrusions 91 and liquid tray 50 slots 53, the liquid container 84 and the liquid tray 50 operationally engage each other in a feed mode. Upon the operational engagement of the liquid container 84 and the liquid tray 50 in the feed mode, the receiver body 29 openings 43 and the liquid container 84 holes 90 are disposed in an aligned open position whereby the liquid nectar 120 flows from the liquid container 84, through the liquid tray 50 second channel 58, through the apertures 78 disposed in each of the flange 71 protuberances 77, and into the moat 60. Upon the flow of liquid nectar 120 into the moat 60, a hummingbird 122 has access to the liquid nectar 120 through the feeding ports 35.

Upon the engagement of the liquid container 84 and the liquid tray 50 in a clean mode, the base 20, the liquid tray 50 and the liquid container 84 are separable from each other to allow a user to clean the device 10. Upon the engagement of the liquid container 84 and the liquid tray 50 in a fill mode, the receiver body 29 openings 43 and the liquid container 84 holes 90 are disposed in an unaligned closed position, whereby the volume of liquid nectar 120 is captured within the liquid container 84.

A mode indicator protuberance 93 is vertically disposed on the upper collar 21 of the base 20. A clean marker 94 is disposed proximal to the liquid container 84 bottom end 89. Upon the alignment of the mode indicator protuberance 93 with the clean marker 94, the liquid tray 50, and the liquid container 94 are engaged in the clean mode whereby the base 20, the liquid tray 50, and the liquid container 84 are separable for cleaning.

A fill marker 95 is disposed proximal to the liquid container 84 bottom end 89 proximal to the clean marker 94. Upon the alignment of the mode indicator protuberance 93 with the fill marker 95, the base 20, the liquid tray 50, and the liquid container 84 are engaged in the fill mode.

A feed marker 96 is disposed proximal to the liquid container 84 bottom end 89 proximal to the fill marker 95. Upon the alignment of the mode indicator protuberance 93 with the feed marker 96, the base, the liquid tray 50, and the liquid container 84 are engaged in the feed mode.

Figure 1:
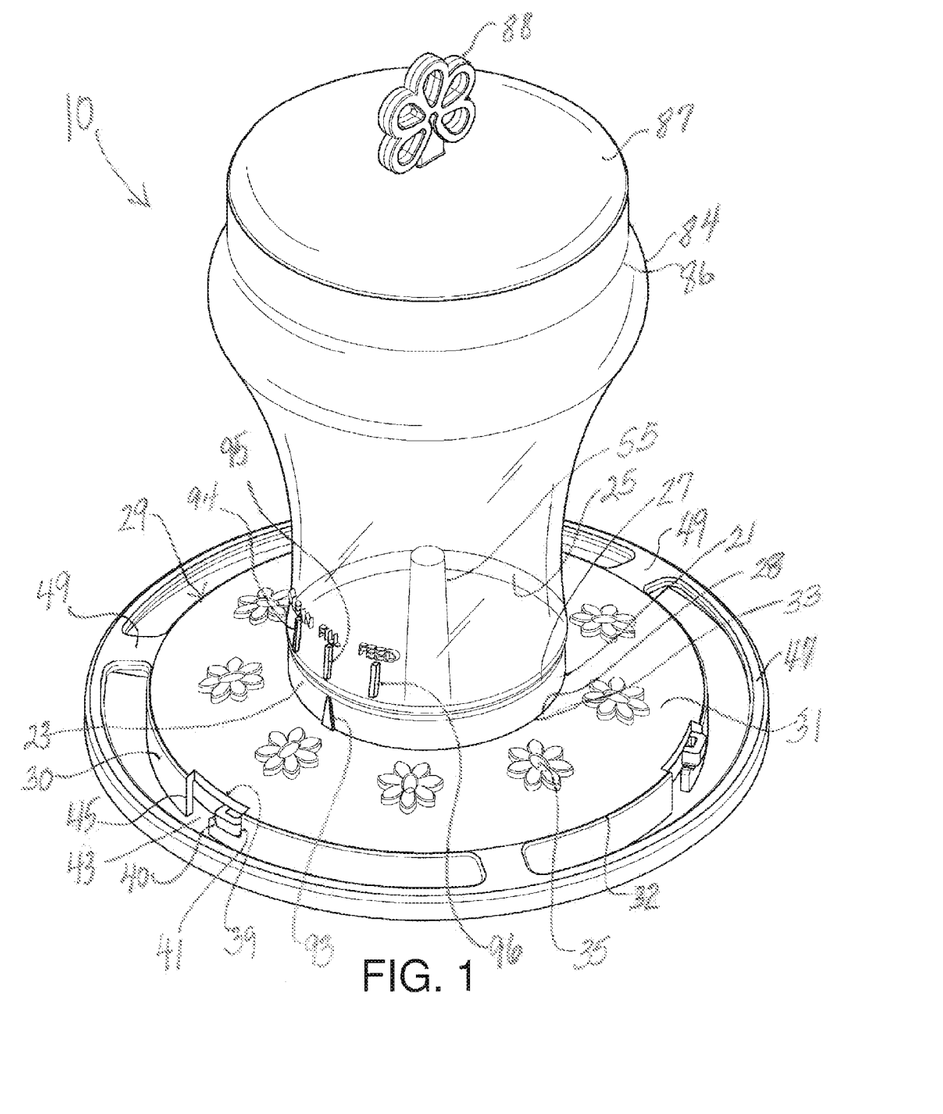
FIG. 1 is an isometric view in a fill mode.
Figure 2:
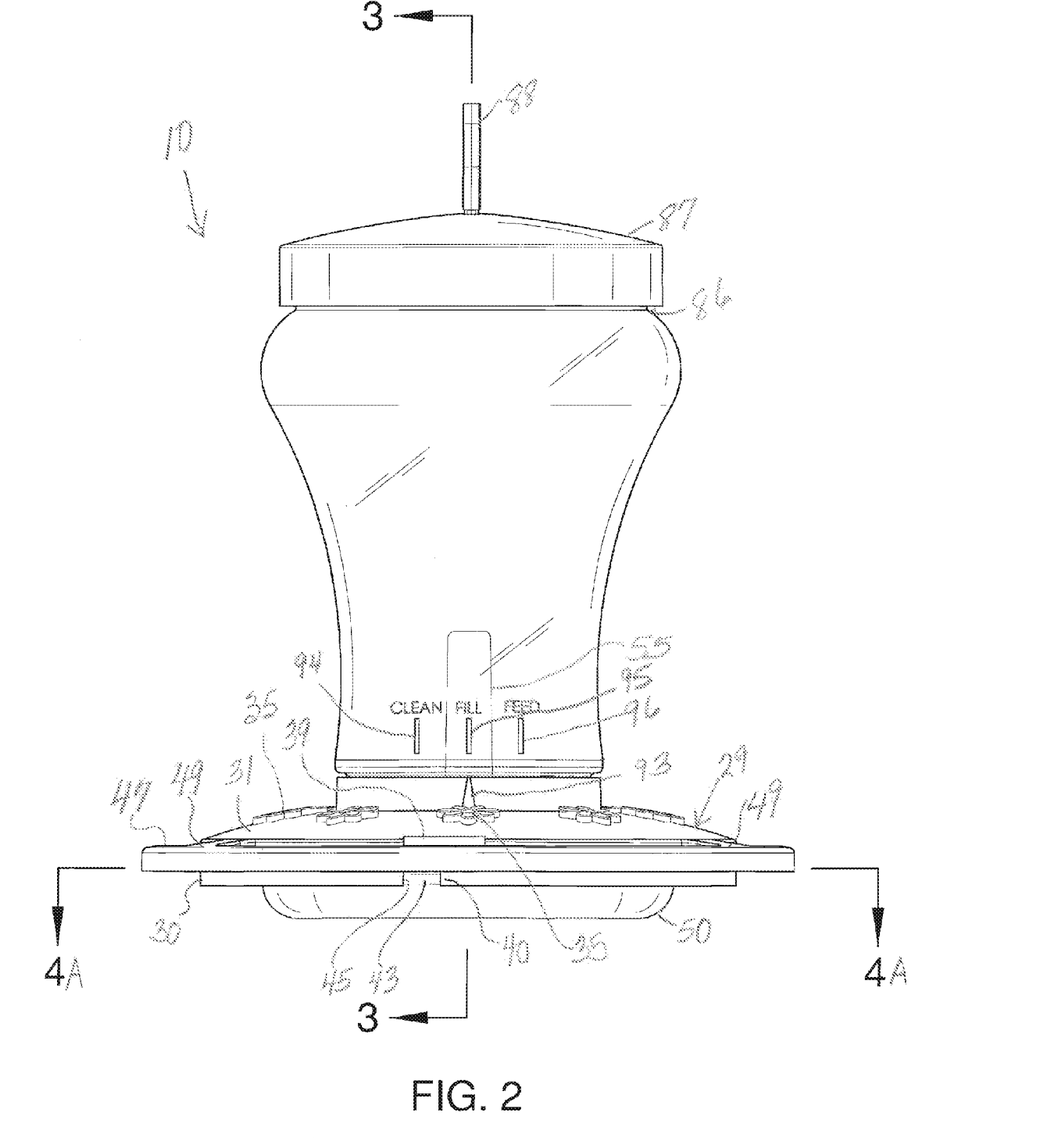
FIG. 2 is a side elevation view in the fill mode.
Figure 3:
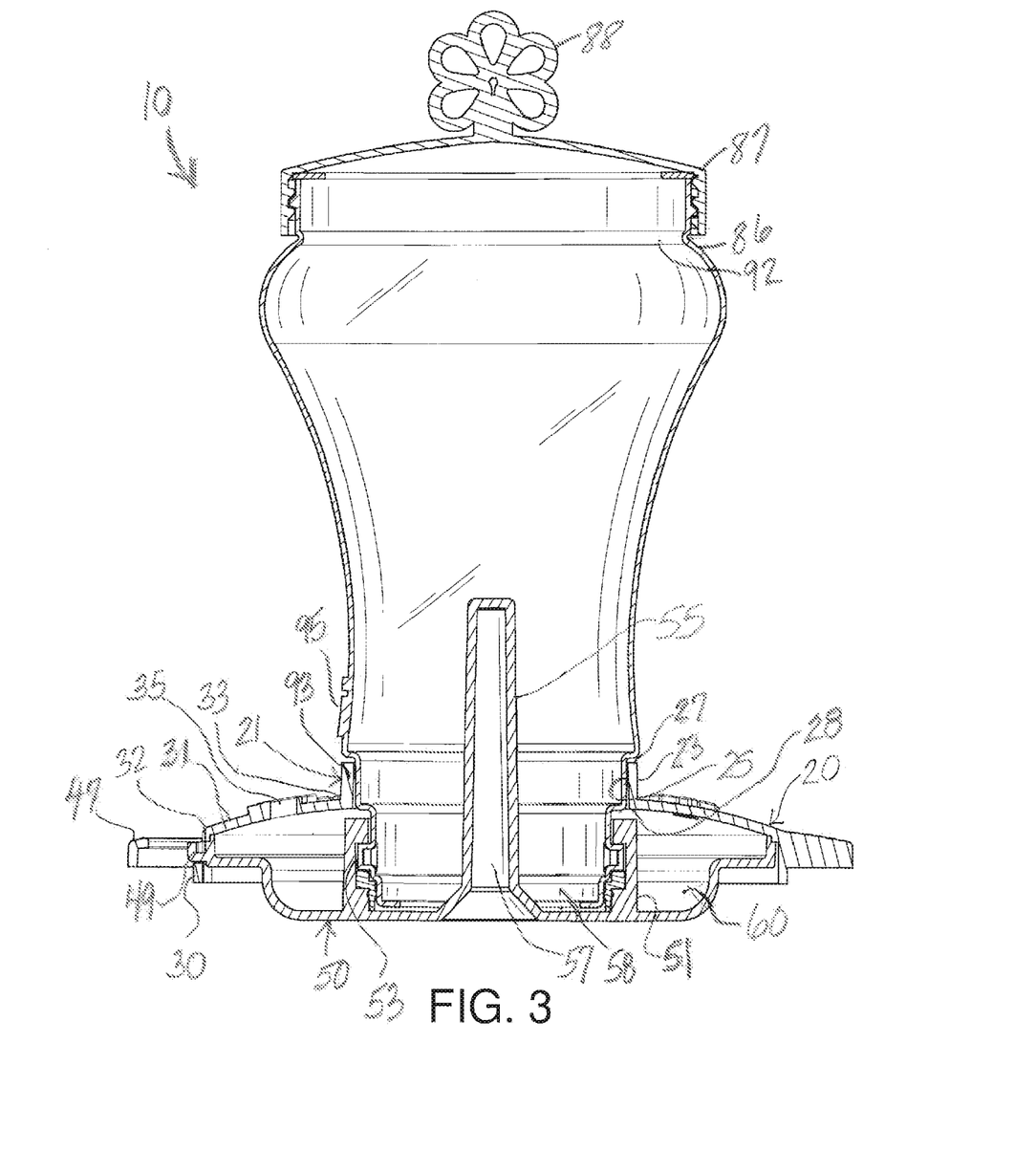
FIG. 3 is a cross-sectional view taken along line 3-3 of FIG. 2.
Figures 4A, 4B:
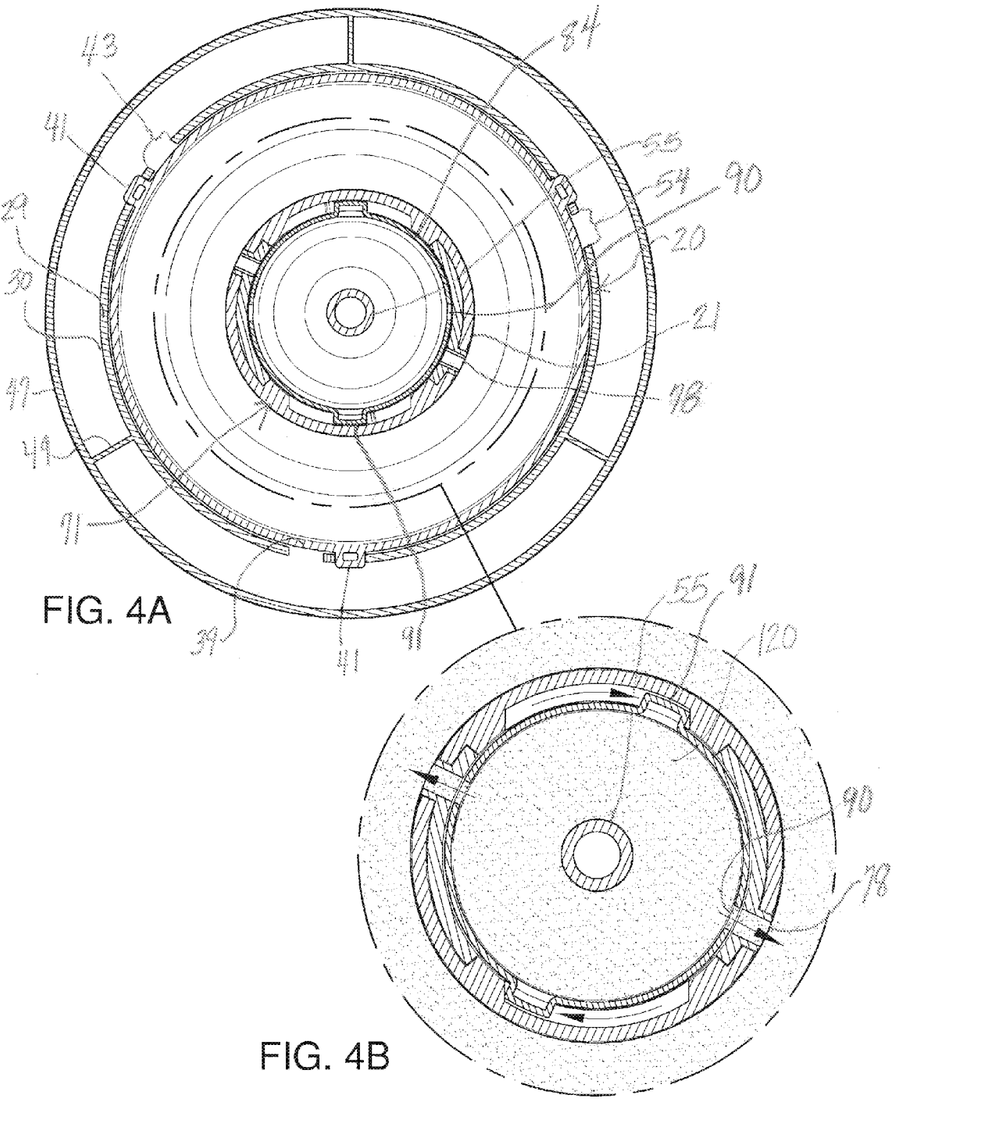
FIG. 4A is a cross-sectional view taken along line 4-4 of FIG. 2.
FIG. 4B is an enlarged partial view of FIG. 4A.
Figure 5:
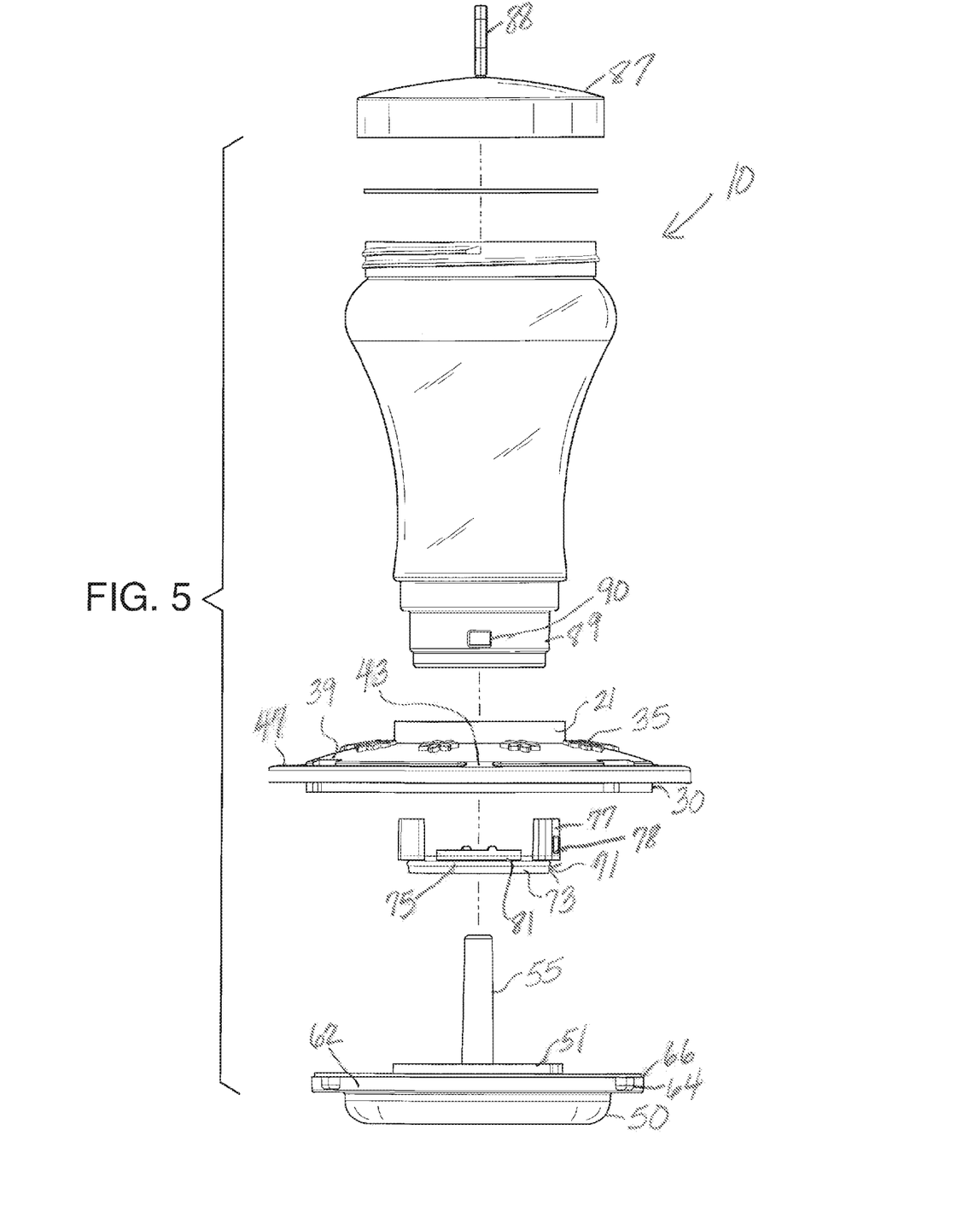
FIG. 5 is an exploded side elevation view.
Figure 6:
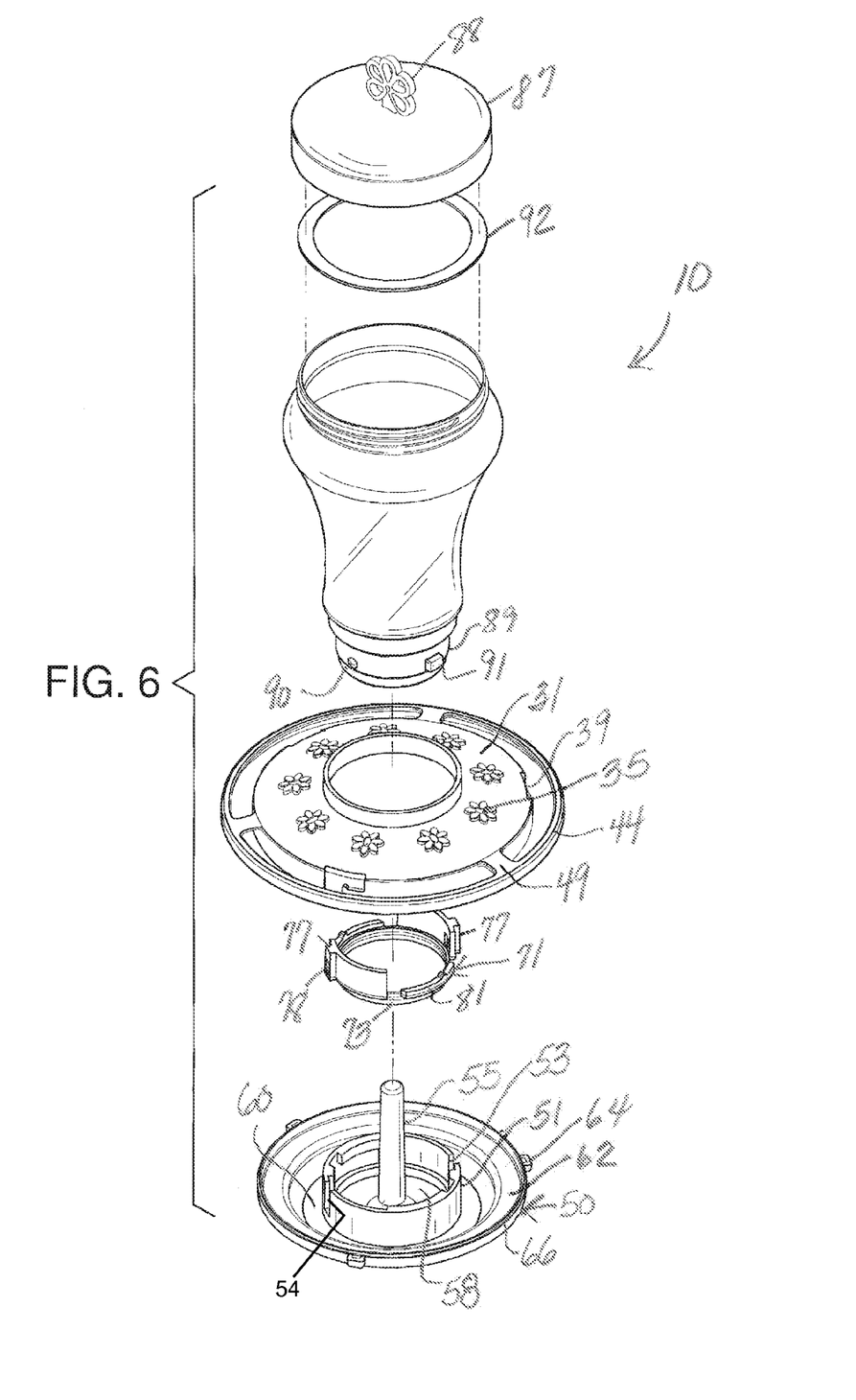
FIG. 6 is an exploded isometric view.
Figure 7:
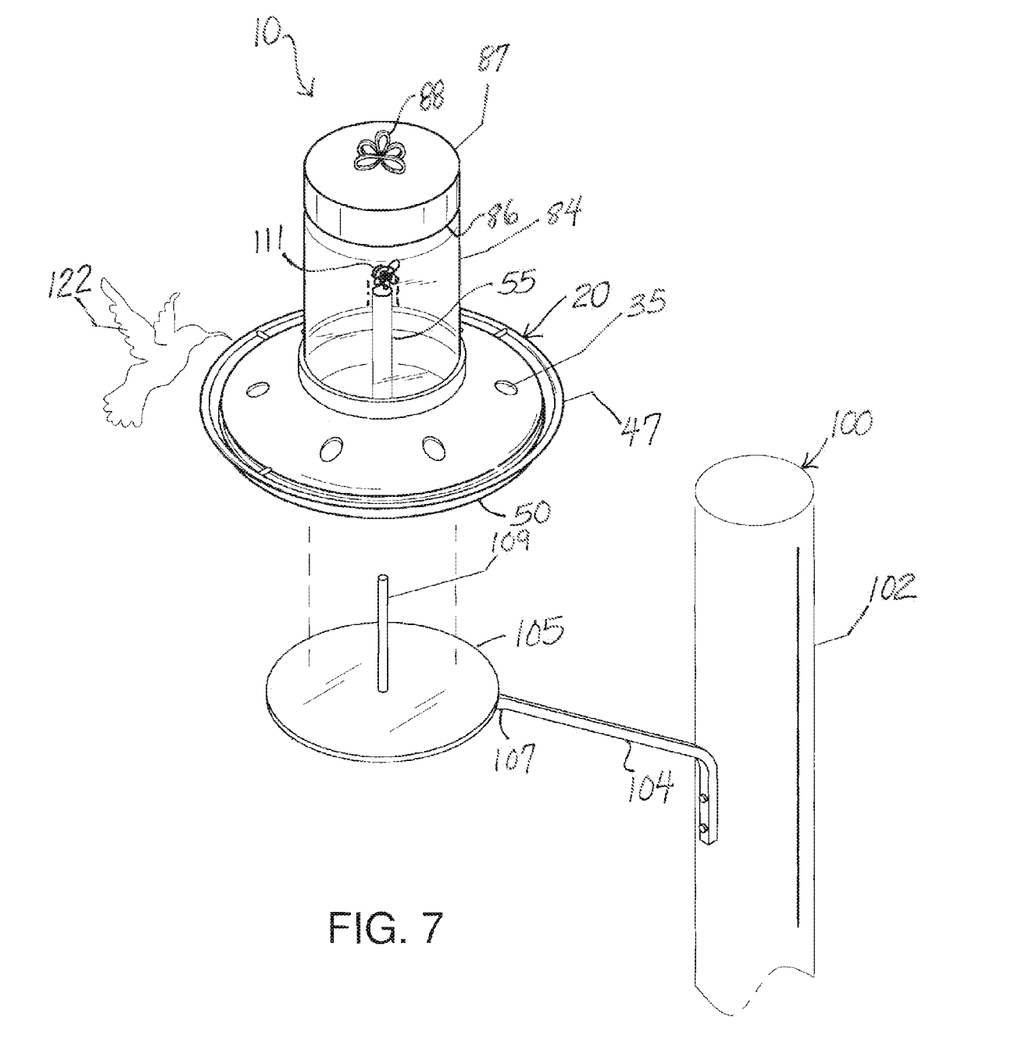
FIG. 7 is an in-use exploded isometric view illustrating mounting of the device onto a support post.

The hummingbird liquid feeder 10 further includes a support post 100. The support post 100 includes a pole 102, at least one horizontally oriented arm 104 attached to the pole 102, and a plate 105 disposed on an outer end 107 of the arm 104. A vertically oriented cylindrical dowel 109 is centrally disposed atop the plate 105. The dowel 109 has a diameter smaller than a diameter of the stabilization member 55. The dowel 109 engages the stabilization member 55 first channel 57 to prevent the spillage of the liquid nectar 120 from the device 10 and to stabilize the device 10 in windy conditions thereby allowing a hummingbird 122 to perch on the perch lip 47. An interchangeable embellishing attachment 111 is removably disposed on the stabilization member 55 to decorate the hummingbird feeder and also to attract hummingbirds.

What is claimed is:

1. A hummingbird liquid feeder comprising:
   a base comprising:
      a centrally-disposed annular upper collar having an exterior side, an interior side, a top edge, and a bottom edge;
      an annular receiver body having a top surface;
      a plurality of spaced apart feeding ports therein;
      a notch disposed between the top surface bottom edge and the receiver body outer wall;

an L-shaped protrusion disposed within the receiver body outer wall on a lower end of each notch;
an annular perch lip attached to the receiver body top surface, wherein the perch lip and the receiver body are concentrically disposed;
a liquid tray comprising:
an annular central collar having a plurality of slots therein;
a plurality of vertically disposed spaced-apart indentations disposed within the central collar;
an elongated vertically-oriented cylindrical stabilization member centrally disposed within the central collar;
a vertically-oriented first channel continuously disposed within the stabilization member;
a second channel continuously disposed between the central collar and the stabilization member;
a moat concentrically disposed in relation to the central collar;
a raised outer rim having a plurality of spaced-apart extending from a perimeter thereof, wherein the outer rim and the moat are concentric;
wherein each of the liquid tray outer rim tabs lockingly engages and alternately disengages one of the respective base receiver body notches;
a flange disposed within the liquid tray second channel, the flange comprising:
a substantially annular body having an interior wall and an exterior wall;
a plurality of spaced-apart protuberances vertically disposed on the exterior wall;
an aperture disposed within each of the protuberances, wherein each aperture aligns with a respective one of the indentations in the liquid tray central collar;
a sealing member disposed between each of the protuberances;
a liquid container configured to contain a volume of liquid nectar, the liquid container comprising:
a sealable top end;
a bottom end having a plurality of spaced-apart holes therein and a locking protrusion horizontally disposed between each of the holes;
wherein the liquid container top end has a diameter at least equal to a diameter of the bottom end;
wherein each locking protrusion lockingly engages and alternately disengages a respective one of the liquid tray slots;
wherein upon the engagement of the locking protrusions and liquid tray slots, the liquid container and the liquid tray operationally engage each other in a feed mode;
wherein upon the engagement of the liquid container and the liquid tray in a clean mode, the liquid container and the liquid tray are separable from each other;
wherein upon the operational engagement of the liquid container and the liquid tray in a fill mode, the receiver body openings and the liquid container holes are disposed in an unaligned closed position, whereby the volume of liquid nectar is captured within the liquid container;
wherein upon the operational engagement of the liquid container and the liquid tray in the feed mode, the receiver body openings and the liquid container holes are disposed in an aligned open position, whereby the liquid nectar flows from the liquid container, through the liquid tray second channel, through the apertures disposed in each of the flange protuberances, and into the moat.

2. The hummingbird liquid feeder of claim 1 further comprising:
a mode indicator protuberance vertically disposed on the upper collar;
a clean marker disposed proximal to the liquid container bottom end;
wherein upon the alignment of the mode indicator protuberance with the clean marker, the base, the liquid tray, and the liquid container are engaged in the clean mode;
a fill marker disposed proximal to the liquid container bottom end;
wherein upon the alignment of the mode indicator protuberance with the fill marker, the base, the liquid tray, and the liquid container are engaged in the fill mode;
a feed marker disposed proximal to the liquid container bottom end; and
wherein upon the alignment of the mode indicator protuberance with the feed marker, the base, the liquid tray, and the liquid container are engaged in the feed mode.

3. The hummingbird liquid feeder of claim 2 further comprising:
a support post comprising:
a pole;
at least one horizontally oriented arm attached to the pole;
a plate disposed on an outer end of the arm;
a vertically oriented cylindrical dowel centrally disposed atop the plate;
wherein the dowel has a diameter smaller than a diameter of the stabilization member;
wherein the dowel engages the stabilization member first channel.

4. The hummingbird liquid feeder of claim 3 further comprising a lid threadingly attached to the liquid container top end; and
a gasket disposed between the top end and the lid.

5. A hummingbird liquid feeder comprising:
a base comprising:
a centrally-disposed annular upper collar having an exterior side, an interior side, a top edge, and a bottom edge;
an annular receiver body having an outer wall, the receiver body comprising:
a quoit-shaped top surface having a lower edge and an upper edge continuously attached to the bottom edge
a plurality of spaced apart feeding ports disposed in the top surface in a position between the lower edge and the upper edge;
a notch disposed between the top surface bottom edge and the receiver body outer wall;
an L-shaped protrusion disposed within the receiver body outer wall on a lower end of each notch;
an opening disposed between a first side of each notch and the respective protrusion;
an annular perch lip having a plurality of first extensions radially disposed therefrom, each first extension disposed between the perch lip and the receiver body outer wall in a central position between a pair of the notches, wherein the perch lip and the upper collar are concentrically disposed;
wherein the perch lip is configured to be gripped by a hummingbird;
wherein the outer wall has a height greater than a height of the perch lip;

a liquid tray comprising:
  an annular central collar having a plurality of slots therein;
  a plurality of vertically disposed spaced-apart indentations disposed within the central collar;
  an elongated vertically-oriented cylindrical stabilization member centrally disposed within the central collar;
  a vertically-oriented first channel continuously disposed within the stabilization member;
  a second channel continuously disposed between the central collar and the stabilization member;
  a moat concentrically disposed in relation to the central collar;
  a raised outer rim having a plurality of spaced-apart tabs extending from a perimeter thereof, wherein the outer rim and the moat are concentric;
  a flange disposed within the liquid tray second channel, the flange comprising:
    a substantially annular body having an interior wall and an exterior wall;
    a plurality of spaced-apart protuberances vertically disposed on the exterior wall;
    an aperture disposed within each of the protuberances, wherein each aperture aligns with a respective one of the indentations in the liquid tray central collar;
    a sealing member disposed between each of the protuberances;
  wherein each of the liquid tray outer rim tabs lockingly engages and alternately disengages one of the respective base receiver body notches, whereby the liquid tray is removably attached to the base;
a liquid container configured to contain a volume of liquid nectar, the liquid container comprising:
  a sealable top end;
  a bottom end having a plurality of spaced-apart holes therein and a locking protrusion horizontally disposed between each of the holes;
  the liquid container top end has a diameter at least equal to a diameter of the bottom end;
  wherein each locking protrusion lockingly engages and alternately disengages a respective one of the liquid tray slots;
wherein upon the engagement of the locking protrusions and liquid tray slots, the liquid container and the liquid tray operationally engage each other in a feed mode;
wherein upon the engagement of the liquid container and the liquid tray in a clean mode, the liquid container and the liquid tray are separable from each other;
wherein upon the operational engagement of the liquid container and the liquid tray in a fill mode, the receiver body openings and the liquid container holes are disposed in an unaligned closed position, whereby the volume of liquid nectar is captured within the liquid container;
wherein upon the operational engagement of the liquid container and the liquid tray in the feed mode, the receiver body openings and the liquid container holes are disposed in an aligned open position, whereby the liquid nectar flows from the liquid container, through the liquid tray second channel, through the apertures disposed in each of the flange protuberances, and into the moat.

6. The hummingbird liquid feeder of claim 5 further comprising:
  a mode indicator protuberance vertically disposed on the upper collar;
  a clean marker disposed proximal to the liquid container bottom end;
  wherein upon the alignment of the mode indicator protuberance with the clean marker, the base, the liquid tray, and the liquid container are engaged in the clean mode;
  a fill marker disposed proximal to the liquid container bottom end;
  wherein upon the alignment of the mode indicator protuberance with the fill marker, the base, the liquid tray, and the liquid container are engaged in the fill mode;
  a feed marker disposed proximal to the liquid container bottom end; and
  wherein upon the alignment of the mode indicator protuberance with the feed marker, the base, the liquid tray, and the liquid container are engaged in the feed mode.

7. The hummingbird liquid feeder of claim 6 further comprising:
  a support post comprising:
    a pole;
    at least one horizontally oriented arm attached to the pole;
    a plate disposed on an outer end of the arm;
    a vertically oriented cylindrical dowel centrally disposed atop the plate;
    wherein the dowel has a diameter smaller than a diameter of the stabilization member;
    wherein the dowel engages the stabilization member first channel.

8. The hummingbird liquid feeder of claim 7 further comprising a lid threadingly attached to the liquid container top end;
  a gasket disposed between the top end and the lid; and
  an attachment member centrally disposed on the lid.

9. The hummingbird liquid feeder of claim 8 further comprising an interchangeable embellishing attachment removably attached to the stabilization member, wherein the embellishing attachment is configured to decorate the hummingbird feeder and to attract hummingbirds.

* * * * *